United States Patent

[11] 3,595,175

| [72] | Inventor | Robert J. Austill |
| | | 2236 Dianne Drive, Santa Clara, Calif. 95050 |
| [21] | Appl. No. | 848,645 |
| [22] | Filed | Aug. 8, 1969 |
| [45] | Patented | July 27, 1971 |

[54] CONVERTIBLE FREIGHT-HOPPER CAR
10 Claims, 3 Drawing Figs.

[52] U.S. Cl. ................................................ 105/243,
105/367, 105/373, 105/376, 105/422, 298/27
[51] Int. Cl. .......................................................... B61d 3/04,
B61d 3/06, B61d 17/10
[50] Field of Search............................................ 105/243,
422, 367, 373, 376; 298/27

[56] References Cited
UNITED STATES PATENTS

| 820,240 | 5/1906 | Mulock | 105/243 |
| 1,067,719 | 7/1913 | Curry | 105/243 |
| 2,186,700 | 1/1940 | Johnson | 105/243 |
| 2,566,977 | 9/1951 | Boulden | 298/27 |
| 3,087,759 | 4/1963 | Worster | 105/243 X |

FOREIGN PATENTS

| 1,255,472 | 1/1961 | France | 105/422 |

Primary Examiner—Arthur L. La Point
Assistant Examiner—Howard Beltran
Attorneys—Jack M. Wiseman and Thomas E. Schatzel ABSTRACT: A vehicular hopper-box freight carrier adapted for transporting freight in granular and/or bulk form. The freight carrier includes a floor surface having a plurality of apertures opening to hopper means for discharging freight of granular form and of sufficient strength to support freight in bulk form above the surface. The carrier includes primary bulkhead means positioned to guide granular freight towards the hopper means and secondary bulkhead means adapted to longitudinally support freight in bulk form.

PATENTED JUL 27 1971   3,595,175

INVENTOR.
ROBERT J. AUSTILL
BY *Jack M. Wiseman*
*Thomas G. Schatzel*
ATTORNEYS

CONVERTIBLE FREIGHT-HOPPER CAR

BACKGROUND OF THE INVENTION

The present invention relates to the transport of freight and more particularly to vehicular freight carriers for transporting freight of granular and/or bulk form, wherein granular form refers to freight most feasibly transported by hopper-type vehicles and bulk form as freight most feasibly transported by box-type vehicles.

In the freight transportation industry, vehicular freight carriers such as railway cars and truck trailers assume various configurations to accommodate freight of granular form and other configurations to accommodate freight of bulk form. Frequently, it is necessary to transport freight of one mode, e.g. granular mode to a destination and then transport from the same destination, freight of another mode, e.g. bulk freight. This is commonly true with food processing plants where grain is transported to the plant and packaged food transported from the plant.

In the prior art there are various convertible-type vehicular freight carriers such as railway freight car structures adapted to transport freight of granular form or freight of bulk form. Though these freight cars take various forms, it is generally necessary to reconfigurate the freight car each time it is desired to change the mode of freight to be transported. Several such structures, in converting from bulk freight to granular freight requires that the floor surface be converted so as to provide access to or to form the hoppers on the underside of the freight car to facilitate unloading of the granular freight. When it is necessary to carry freight of bulk form, it is desirable to have a flat floor surface. Thus, the floor members are returned so as to support the bulk on a common plane over the hoppers and prevent it from dropping to within the hoppers. For loading and unloading bulk freight, the floor surface structure must be so designed to support loading machinery within the freight car assisting in the loading and unloading operation.

SUMMARY OF THE PRESENT INVENTION

The present invention provides a vehicular hopper-box freight carrier for carrying freight in granular and/or bulk form without the necessity of converting the carrier when it is desired to change the mode of freight to be transported. The flooring surface is secured in place allowing immediate use of the carrier independent of the mode of freight. The carrier alleviates maintenance and personnel requirements otherwise necessary to convert the flooring surface each time the mode of freight is changed. This provides savings in time and economics.

In an exemplary embodiment of the present invention there is provided a railway freight car which from the exterior assumes a configuration similar to that of a standard hopper car with hoppers supported on the underside to release granular freight and chutes on the topside to permit loading of granular freight. However, within the interior there is provided an open grid floor surface over the hopper means. The floor surface structure carries a plurality of apertures of sufficient size to permit passage of granular freight to the hopper means. At the same time, the floor surface structure and the aperture pattern is selected to be of sufficient strength to support freight in bulk form above the hopper means and to permit mobile loading equipment to be propelled thereover. The freight car may include side entries to provide ingress and egress for bulk freight and loading equipment.

In this instance, the primary bulkhead, defined as those walls longitudinally supporting and guiding granular freight, may be the sloping end walls of the freight car which are commonly positioned at an angle to simultaneously longitudinally support and guide granular freight towards the hopper means. A secondary bulkhead, defined as those walls for longitudinally supporting freight of bulk form, may be included to longitudinally support bulk freight at an angle substantially normal to the floor surface so as to provide a uniform pattern for the bulk freight. The secondary bulkhead may include a common plane structure carrying a plurality of apertures through which the granular freight may pass so as to fill up the otherwise void area intermediate the primary bulkhead and the secondary bulkhead. Another disclosed approach is for the secondary bulkhead to take the form of a plurality of individual rise and level planes joined together in a stairstep configuration. Bulk freight may be placed on the individual levels and longitudinally supported by the rises. At the same time, the individual rises and levels carry a plurality of apertures to permit passage of granular freight and encompass the space intermediate the secondary and primary bulkhead means. In this manner, when the freight car is to be utilized for carrying granular freight, the entire car may be filled with no loss in space due to the secondary bulkhead or the floor surface. At the same time, the secondary bulkheads and floor surface provide for uniformly loading bulk freight as is customarily desired.

Another embodiment includes a freight car which from the exterior appears to be a standard boxcar with a plurality of hopper means on the underside and chutes on the topside. Within the freight car there is an open grid floor surface over the hoppers including a plurality of apertures permitting access of granular freight to the hoppers. The primary bulkhead may then be in the form of a solid wall member engaging the bottom surface at the point of intersection of the hopper means. The primary bulkhead means precludes passage of granular-type freight therethrough and guides it to the hoppers. The primary bulkhead means may be positioned at an obtuse angle or substantially normal to the floor surface. At the same time, the primary bulkhead may be positioned substantially normal to the bottom surface to support freight in bulk in which capacity it serves the function of the secondary bulkhead. The primary bulkheads may also be supported on a track such that when it is desired to use the freight car for bulk freight the primary bulkheads may be moved to various positions within the boxcar to permit the use of more available space within the car or to longitudinally restrain the bulk freight.

DESCRIPTION OF THE PREFERRED EMBODIMENT

Figure 1:
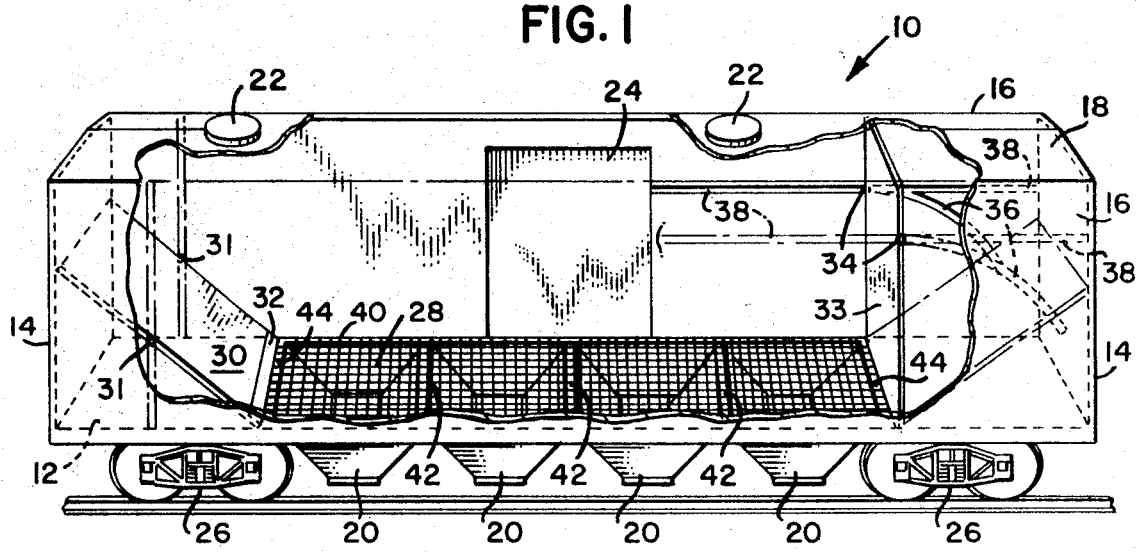
FIG. 1 illustrates in perspective and partially sectioned a hopper-box railway freight car according to the present invention which from the exterior takes the general shape of a standard railway boxcar.

FIG. 1 depicts a vehicular hopper-box freight carrier in the form of a railway car according to the teachings of the present invention and referred to by the general reference character 10. The freight car 10 includes a bottom surface 12, a pair of end surfaces 14, a pair of sidewalls 16 and a top surface 18. The various surfaces are enclosed to form an enclosed substantially rectangular-shaped area similar to a box common to that of a standard railway boxcar. Joined to the bottom surface 12 are hopper means in the form of a plurality of hoppers 20. The individual hoppers 20 are adapted to permit egress of freight of granular form from the interior of the car 10. The top surface 18 carries a plurality of input chutes or roof hatches 22 adapted for receiving freight in granular form to facilitate loading granular freight. The sidewalls 16 carry a side opening passage 24 with conventional sliding doors on the exterior of the car to permit ingress and egress of freight in bulk form and mobile loading equipment such as lift trucks. The car 10 is supported about its bottom surface 12 by a pair of bogies 26 as is standard with railway freight cars. As depicted, the hoppers 20 are positioned intermediate the bogies such that there is an area within the car 10 over the bogies which does not have direct access to a hopper.

The bottom surface 12 of the freight car 10 comprises an open grid floor surface section 28 supported over the hoppers 20. The floor surface 28 carries a plurality of individual apertures of sufficient size to permit the passage of granular-type freight such as grain, powdered cement, ores, etc. As such, the granular freight passes directly through the floor surface 28 to the hoppers 20. Thus, granular freight may be loaded through the chutes 22 and when unloaded pass directly out the hoppers 20 similar to that of a standard hopper car. The car 10 further carries a primary bulkhead means in the form of longitudinally supportive walls 30 and 33 linked to the hopper means. The wall 30 may be pivoted about a balance point formed by a trunnion 31 secured to the sidewalls 16 to permit relatively easy pivoting of the wall 30. As illustrated by the solid lines, the wall 30 may include an extension 32, if desired. To accommodate granular freight, the wall 30 forms an obtuse angle with the floor surface 28 and guides granular freight to the hoppers 20. To accommodate bulk freight, the extension 32 may be retracted and the wall pivoted about the trunnion 31 to a vertical position, as indicated by the broken lines. As such, the wall 30 provides longitudinal support for bulk freight. The wall 30 forms an obtuse angle with the floor surface 28 so that more space may be utilized than when the wall 30 is vertical to the floor surface. To further illustrate a vertical primary bulkhead, the wall 33 is supported at an angle normal to the floor surface 28. The panel 33 may be designed to permanently assume the normal position in which case both granular freight and bulk freight are accommodated. However, there is then an empty cavity intermediate the walls 14 and 33 over the bogie 26. To make more use of the space available, the walls 33 may carry a trunnion 34 on each side for engaging within guide tracks 36 and 38 integral with the sidewalls 16. The tracks 36 are arcuate to facilitate tilting the wall 33 at an angle when the freight is granular. At the same time, the guide tracks 38 are parallel with the floor surface and extend to the end walls 14. Thus, when it is desired to transport bulk freight, the wall 33 is slid up against the walls 14 to permit more space for bulk freight or to other positions to longitudinally restrain the bulk freight.

Accordingly, FIG. 1 depicts various structures which the supportive walls 30 and 33 may assume. The walls may be permanently secured in position and linked to the hopper means at an angle substantially normal to the flooring surface 28. This structure would alleviate the need for any conversion of the freight car for granular or bulk freight and the walls would simultaneously serve as the primary and secondary bulkhead. The embodiment of the panel 30 allows for conserving space over the bogie by pivoting and forming an obtuse angle relative to the floor surface when used as a hopper and when used as a box to be perpendicular to the floor surface 28 at a position over the bogie. The panel 33 illustrates a further approach such that when bulk freight is transported all the space over the bogies 26 is utilized.

The perforated section of the floor surface 28 comprises a member of individual means tied in a grid pattern. The perforated section 28 is supported longitudinally along the walls 16 by support members 40 and laterally by a plurality of lateral support members 42 intermediate the hoppers 20 and by an end lateral support members 44 common to the point of intersection of the bulkhead members 30, 33 with the floor 28. The floor surface 28 becomes an integral part of the floor surface 12 within the regions intermediate the end walls 14 and the support members 44. Accordingly, the floor surface section 28 is integral with the car 10 and is secured in place independent of the mode of freight being transported. There is no conversion necessary to accommodate changing modes of freight.

Figure 2:
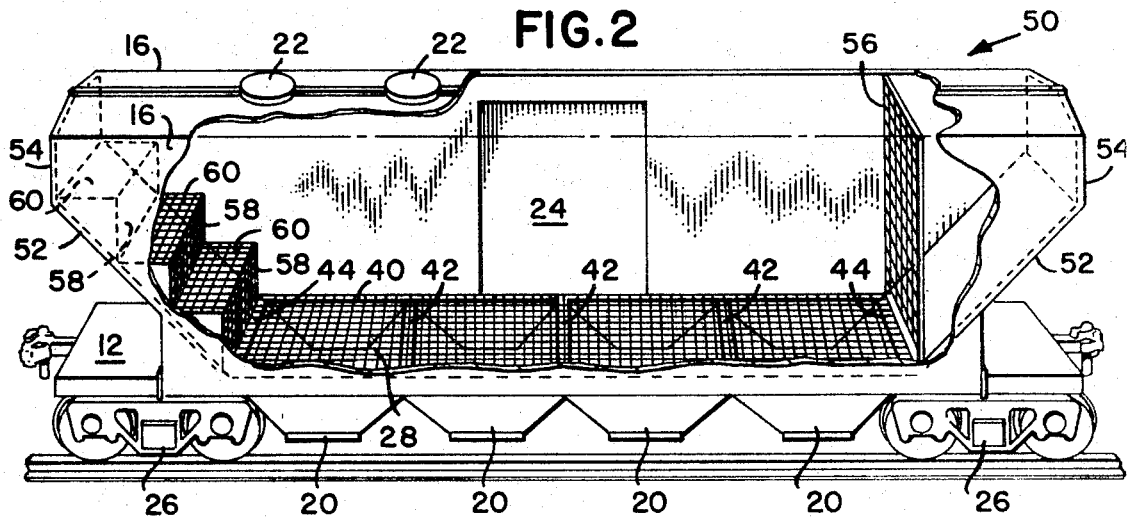
FIG. 2 illustrates in perspective and partially sectioned a hopper-box railway freight car according to the present invention which from the exterior takes the general shape of a standard railway hopper car.

FIG. 2 illustrates an alternative embodiment of the freight car according to the present invention, and referred to by the general reference character 50. From the exterior, the freight car 50 assumes the general appearance of a standard hopper car with side opening passages 24. In order to avoid redundancy, features of the freight car 50 common to those of the freight car 10 carry the same reference numerals. In the freight car 50 the end walls of the car are linked with the hopper means and angled so as to provide a sliding slope for granular-type freight to engage the hoppers 20 and serve as the primary bulkhead means. The end walls of the freight car 50 comprise a first wall segment 52 supported at an obtuse angle relative to the floor 28 and a second wall segment 54 which is relatively perpendicular to the floor 28. Accordingly, the standard format of the car 50 is adapted for carrying freight in granular form. To carry bulk freight, the car 50 integrally carries the relatively flat flooring means 28 to vertically support the bulk freight and accommodate mobile loading machinery. It is further desirable to incorporate a longitudinal support means for bulk freight. The freight car may carry a secondary bulkhead 56 including a plurality of apertures of a size sufficient to permit passage of granular freight. The bulkhead may comprise a single flat panel 56 positioned normal to the plane of the floor surface 28. In this manner, longitudinal support is provided for bulk freight and granular freight may fill up the otherwise void area intermediate the wall segments 52, 54 and the panel 56. An alternative secondary bulkhead adapted to conserve space when transporting bulk freight may comprise a plurality of individual rises and levels 60 joined together to form a stairstep configuration. The levels 60 vertically support the bulk freight while the rises 58 provide longitudinal support. The primary bulkheads of FIG. 2 may comprise a plurality of crosstied rods, e.g. ½-inch diameter steel rods.

Figure 3:
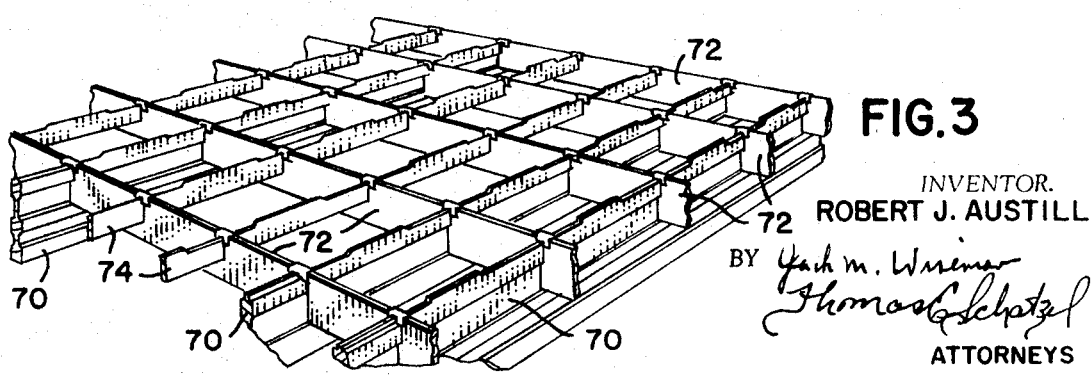
FIG. 3 illustrates in perspective a section of a flooring surface for the hopper boxcars of the present invention.

As discussed, the open grid floor structure 28 is preferably designed to support heavy loads as in standard boxcars and to have an open grid pattern so granular freight can flow through to the hoppers below and to directly accommodate mobile loading equipment. Desirable flooring structure may be of the type sometimes used for highway bridge decking. Viewing FIG. 3, there is depicted a section for a flooring surface 28. The structure comprises a plurality of carrying beams 70 which extend longitudinal within the car and engage the lateral support members 42 and 44. The beams 70 are intersected at right angles and interlocked with crossbars 72 which may at their ends engage the longitudinal support members 40. The crossbars 72 in turn support longitudinal running bars 74 spaced between the beams 70. The various beams and supports may comprise structural steel, aluminum or stainless steel.

I claim:

1. A convertible freight hopper car comprising, in combination:

an enclosed freight car having a top wall, sidewalls, end walls and a bottom surface, said bottom surface comprising hopper means for the discharge of granular freight from the freight car; and an open grid floor surface forming a plane over said hopper means and forming a plurality of apertures communicating with said hopper means, the apertures being of a sufficient size to permit the particles of granular freight over the floor surface to flow into said hopper means, said floor surface also forming a plane to support bulk freight thereon;

said top wall being formed with means communicating with the interior of said car for loading granular freight into the car;

said sidewalls being formed with doors movable to provide side loading openings for ingress and egress of bulk freight to and from said freight car;

said floor surface comprising a plurality of tie members secured together to form a grid pattern;

primary bulkhead means linked with said hopper means to guide granular freight toward said hopper means; and guide track means including primary cooperating means on the primary bulkhead means for guiding the primary bulkhead means toward and away from said end walls.

2. The freight carrier of claim 1 in which the floor surface is secured in place and forming a surface over which mobile loading equipment may be directly operated.

3. The freight carrier of claim 1 further including means pivoting the primary bulkhead means toward and away from the floor surface.

4. The freight carrier of claim 1 in which said end walls are substantially normal to the floor surface with the point of intersection of the floor surface and end walls spaced from the hopper means, the primary bulkhead means being linked to the hopper means.

5. The freight carrier of claim 4 in which the primary bulkhead means are pivotable relative to the floor surface at the linking point with the hopper means.

6. The freight carrier of claim 4 in which the primary bulkhead means are substantially normal to the floor surface and engage the floor surface at the point of intersection with the hopper means.

7. A convertible hopper car freight comprising, in combination:

an enclosed freight car having a top wall, sidewalls, end walls and a bottom surface, said bottom surface comprising hopper means for the discharge of granular freight from the freight car;

an open grid floor surface forming a plane over said hopper means and forming a plurality of apertures communicating with said hopper means, the apertures being of a size sufficient to permit particles of granular freight over the floor surface to flow therethrough into said hopper means, said floor surface forming a plane to support bulk freight thereon;

said top wall being formed with means communicating with the interior of said car for loading granular freight into said car;

said sidewalls being formed with doors movable to provide side loading openings for ingress and egress of bulk freight to and from said freight car;

primary bulkhead means mounted in said car to guide granular freight toward said hopper means; and secondary bulkhead means disposed in said car and spaced inboard with respect to said primary bulkhead to support bulk freight thereagainst, said secondary bulkhead means being formed with apertures to permit the passage of granular freight therethrough.

8. The freight carrier of claim 7 in which the secondary bulkhead means includes a plurality of members secured together to form a grid pattern.

9. The freight carrier of claim 7 in which said end walls slope toward the hopper means and the secondary bulkhead means are spaced inwardly from the end walls.

10. The freight carrier of claim 7 in which the secondary bulkhead means is configured to include a plurality of individual horizontal and vertical planes joined in a stairstep configuration with individual vertical and level planes.